United States Patent [19]

Thüer et al.

[11] Patent Number: 5,180,495

[45] Date of Patent: Jan. 19, 1993

[54] WATER PURIFICATION PROCESS

[75] Inventors: Markus Thüer, Rheinfelden; Gerhard Stucki, Ormalingen; Roland Boss, Bubendorf, all of Switzerland

[73] Assignee: Ciba-Geigy Corporation, Ardsley, N.Y.

[21] Appl. No.: 695,373

[22] Filed: May 3, 1991

[30] Foreign Application Priority Data

May 8, 1990 [CH] Switzerland .................. 1554/90

[51] Int. Cl.$^5$ .......................... C02F 3/08; C02F 3/30
[52] U.S. Cl. .................................. 210/605; 210/617; 210/630; 210/908
[58] Field of Search .............. 210/610, 611, 616–618, 210/605, 630, 631, 908, 909

[56] References Cited

U.S. PATENT DOCUMENTS

| | | | |
|---|---|---|---|
| 4,663,047 | 5/1987 | Krauthausen et al. | 210/617 |
| 4,749,491 | 6/1988 | Lawes et al. | 210/610 |
| 4,954,258 | 9/1990 | Little | 210/611 |
| 4,992,174 | 2/1991 | Caplan et al. | 210/610 |
| 5,037,551 | 8/1991 | Barkley et al. | 210/610 |
| 5,057,211 | 10/1991 | Bryant et al. | 210/610 |

FOREIGN PATENT DOCUMENTS

| | | |
|---|---|---|
| 0297417 | 1/1989 | European Pat. Off. |
| 3800713A1 | 8/1989 | Fed. Rep. of Germany |
| 3816679 | 11/1989 | Fed. Rep. of Germany |

*Primary Examiner*—Thomas Wyse
*Attorney, Agent, or Firm*—Kevin T. Mansfield; Edward McC. Roberts

[57] ABSTRACT

A process for purifying water, wherein the water, which is polluted by a mixture of halogenated compounds, preferably halogenated hydrocarbons, is passed through at least two reactors (treatment stages) packed with a porous material populated by one or more microorganisms, one of the reactors being operated under anaerobic conditions and being followed by an aerobically operated reactor; in this way, almost complete elimination of the halogenated compounds, preferably halogenated hydrocarbons, is achieved.

15 Claims, No Drawings

WATER PURIFICATION PROCESS

The present invention relates to a novel process for purifying water which contains a mixture of halogenated compounds, preferably halogenated hydrocarbons, and to equipment for carrying out the process.

Diverse studies of the biodegradation of halogenated compounds, preferably halogenated hydrocarbons, have been carried out in the past. These studies, however, deal only with the degradation of individual substances at a relatively high concentration under laboratory conditions, in order to elucidate the degradation mechanisms. In the course of cleaning up contaminated sites, however, it has been found that, for this purpose, processes are required which eliminate mixtures of halogenated compounds, preferably halogenated hydrocarbons, at a low concentration as completely as possible. For this purpose, it was proposed, for example, to pass the water in question over activated carbon filters and then to dispose of the contaminated activated carbon. In addition to unsolved problems connected with the disposal of such carbons, continuous renewal of the activated carbon filter is an industrially involved and expensive process.

It has now been found that most of the halogenated compounds, preferably halogenated hydrocarbons, which pollute the water can be biodegraded to the extent of more than 90% of their concentration by the process illustrated below.

The process according to the invention comprises passing the water, which is polluted by a mixture of halogenated compounds, preferably halogenated hydrocarbons, through at least two reactors (treatment stages) packed with a porous material populated by one or more microorganisms, the first reactor being operated under anaerobic conditions and being followed by an aerobically operated reactor.

In a further embodiment of the process, both the anaerobic and aerobic treatment stages can take place in a plurality of reactors. The reactors can be arranged in parallel or in series.

The concentration of the halogenated compounds, preferably halogenated hydrocarbons, present in a mixture is in general 10 $\mu$g/l-10 g/l, preferably 100 $\mu$g/l-10 mg/l, of water.

Within the scope of this invention, the term water comprises contaminated ground waters and effluents of the most diverse origin, for example ground water, surface water, landfill seepage water, domestic effluent, concentrated effluent, process effluent, industrial effluent and mixtures of these waters.

The mixture of the halogenated compounds, preferably halogenated hydrocarbons, which pollute the water is a mixture of aliphatic and/or aromatic substances. Preferably, the halogenated hydrocarbons have up to 9 carbon atoms. The compounds, preferably halogenated hydrocarbons, are substituted, and even polysubstituted, by halogen atoms, chlorine and bromine being preferred. The following list of halogenated hydrocarbons serves as an illustration, without it being intended to restrict the possible hydrocarbons thereto: carbon tetrachloride, chloroform, 1,1,2,2-tetrachloroethane, 1,1,1-trichloroethane, 1,2-dichloroethane, 1,2,3-trichloropropane, tetrachloroethene, trichloroethene, cis- and/or trans-1,2-dichloroethene, 1,1-dichloroethene, cis-1,3-dichloropropene, 1,2-dichlorobenzene, 1,3-dichlorobenzene, 1,4-dichlorobenzene, 3-chlorotoluene and bromobenzene, and also variously substituted chlorophenols and dichlorophenols; a mixture comprising trichloroethene, tetrachloroethene, 1,2,3-trichloropropane, chloroform and/or 1,3-dichlorobenzene is preferred.

The possible porous materials can be naturally occurring materials or synthetic materials; the following are preferred: sintered glass, vulcanic rock, expanded shale, expanded clay, sand, foamed plastic (for example polyurethane foam with and without incorporated activated carbon particles) and activated carbon. For practical reasons, mainly sintered glass, polyurethane foam and activated carbon can be used, activated carbon being particularly preferred. In addition to good fixing of the microorganisms, activated carbon also shows a good buffer action for the pollutants.

The microorganisms which can be used according to the invention can be obtained in diverse ways. The microorganisms can also be mixed population. Useful microorganisms can be isolated from sewage sludge or contaminated soils, or the microorganisms are preferably employed as a pure culture. More detailed information on the isolation and culturing of microorganisms can be taken from the article by A.M. Cook et al. in Experientia 39, page 1191 (1983), which is hereby incorporated in the description.

To maintain anaerobic conditions in the first stage of the process, it may be necessary to add to the water a substance which serves as a carbon source. For example, alcohols, organic acids or also sugars are suitable for this purpose, and methanol is preferably used. The monitoring of the anaerobic state of the first stage is possible via the gas production (methane). This gas production should be kept as low as possible, since there is otherwise a risk of some of the halogenated compounds being discharged with this gas and therefore not being degraded.

In the second process stage, the aerobic degradation, it may be necessary, due to the nutrient requirement and, in some cases, oxygen requirement of the microorganisms, to add the required nutrients, for example in the form of inorganic salts, to the water before it passes through the reactor, and the oxygen concentration of the water can also be increased if necessary. A solution of $H_2O_2$ in water, which is added in a concentration of 0.5-50%, depending on the throughput rate of water and on the metering devices, is preferred for an addition of "oxygen".

Moreover, in the case of heavily polluted water or weakly buffered water, overacidification of the reactor can occur, since the degradation of the halogenated compounds leads to an increase in the hydrogen halide concentration. In such a case, it is advantageous to adjust the pH, preferably upstream of one reactor or a plurality of reactors, by addition of a base, for example NaOAc or $NaHCO_3$, to the water or, especially if a fluid-bed reactor is used, to provide automatic pH control in the circulation.

The process can be carried out in a temperature range of, for example, 5°-35° C.

For carrying out the process, conventional fixed-bed reactors are used. In general, the reactor type has no influence on the degradation rate but, in the case of very high pollutant insert concentrations, a fluid-bed reactor is preferably used, while a fixed-bed reactor is preferred at very low concentrations.

The example which follows illustrates the invention without restricting it thereto.

EXAMPLE

A column (packed volume 5 l), filled to the extent of ⅔ with sintered glass beads (diameter 1-5 mm), is operated as an anaerobic fixed-bed circulation reactor. Sludges from effluent treatment plants and pilot plants, which have been in contact with halogenated compounds, preferably hydrocarbons, for a prolonged period are used as the inoculation material. The natural ground water fed is enriched with a mixture of 7 to 17 different halogenated hydrocarbons, each at 1 mg/l, and 50 (20 to 100) mg/l of methanol and 1 to 10 mg/l of yeast extract.

Per day, 10 l of "contaminated" ground water are fed to the unit; the temperature of the reactor is held at 35° C. and the pH in the reactor between 6.5 and 7.5.

The outflow from the anaerobic unit is passed into the aerobic stage.

The aerobic reactor consists of a slender glass column of 2 l capacity, half of which is filled with quartz sand (diameter 0.5 to 0.8 mm) and is operated as a fluid-bed circulation reactor. The original bed volume of the quartz sand of 50% (in the rest condition) expands to about 80% of the reactor volume. Dilute $H_2O_2$ as an oxygen source is fed into the water circulation, under control via an oxygen measurement. Sludges from various effluent treatment plants, which have been in contact with halogenated substances for a prolonged period, are used as the inoculation material.

Per day, about 4 l of ground water pretreated in the first anaerobic stage are fed to the unit; the temperature of the bioreactor is at room temperature, and the pH in the reactor is between 6.5 and 7.5.

The degradation of the individual substances is measured by head-space gas chromatography in the inflow and outflow of the unit.

The following degradation rates per individual substance (within the mixture) are found for the 2-stage system (anaerobic/aerobic):

| Running period in days since start of the test days | Trichloro- ethene % | Tetra- chloro- ethene % | 1,2,3-Tri- chloro- propane % | Chloro- form % | 1,3- Dichloro- benzene % |
|---|---|---|---|---|---|
| 29 | 60 | 72 | 29 | 79 | 80 |
| 57 | 59 | 72 | 26 | 86 | 79 |
| 106 | 65 | 78 | 29 | 68 | 74 |
| 133 | 80 | 78 | 30 | 52 | 75 |
| 196 | 95 | 90 | 45 | 87 | 83 |
| 211 | 99 | 97 | 99 | 99 | 85 |

What is claimed is:

1. A process for purifying water, which comprises passing the water, which is polluted by a mixture of halogenated hydrocarbons, present in a concentration range of 10 μg/l-10 g/l of water, through at least two reactors (treatment stages) packed with a porous material populated by one or more microorganisms, one of the reactors being operated under anaerobic conditions and being followed by an aerobically operated reactor.

2. A process according to claim 1, wherein the anaerobic or aerobic or both treatment stages are carried out in a plurality of reactors which are arranged in parallel or in series.

3. A process according to claim 1, wherein the halogenated hydrocarbons are chlorinated or brominated compounds.

4. A process according to claim 1, wherein the halogenated hydrocarbons contain up to 9 carbon atoms.

5. A process according to claim 4, wherein the halogenated hydrocarbons are selected from the group consisting of trichloroethene, tetrachloroethene, 1,2,3-trichloropropane, chloroform and 1,3-dichlorobenzene.

6. A process according to claim 1, wherein the porous material is selected from the group consisting of sintered glass, vulcanic rock, expanded shale, expanded clay, sand, foamed plastic and activated carbon.

7. A process according to claim 1, wherein the porous material is selected from the group consisting of sintered glass, polyurethane foam, polyurethane foam with incorporated activated carbon particles and activated carbon.

8. A process according to claim 1, wherein the porous material is activated carbon.

9. A process according to claim 1, wherein the microorganisms used are obtained from a source selected from a pure culture, sewage sludge and contaminated soils.

10. A process according to claim 1, wherein a carbon source is added to the water before it passes through the first process stage or, in the case of the second process stage, an oxygen-releasing substance or nutrients or both are added.

11. A process according to claim 10, wherein the substance used as the carbon source is selected from the group consisting of alcohols, organic acids and sugars.

12. A process according to claim 11, wherein the substance used as the carbon source is methanol.

13. A process according to claim 1, wherein $H_2O_2$ as the oxygen-releasing substance is added to the water before the aerobic stage.

14. A process according to claim 1, which comprises passing the water, which is polluted by a mixture of halogenated hydrocarbons selected from the group consisting of trichloroethene, tetrachloroethene, 1,2,3-trichloropropane, chloroform and 1,3-dichlorobenzene in a concentration of 100 μg/l–50 mg/l, through two series-arranged fixed-bed or fluid-bed reactors packed with sintered glass populated by microorganisms obtained from sewage sludges, the first reactor being operated under anaerobic conditions and being followed by an aerobically operated reactor, methanol being added to the water before it passes through the anaerobically operated reactor, and an aqueous $H_2O_2$ solution being added before passing through the aerobically operated reactor.

15. A process according to claim 1, wherein the pH is adjusted in both or in only one of the process stages.

* * * * *